(12) United States Patent
McLaughlin et al.

(10) Patent No.: US 6,944,215 B2
(45) Date of Patent: Sep. 13, 2005

(54) METHOD AND APPARATUS FOR TRANSMITTING DATA FROM AN ANALOGUE MODEM TO A DIGITAL MODEM THROUGH AN ANALOGUE CHANNEL

(75) Inventors: Michael McLaughlin, Leopardstown (IR); Brian O'Sullivan, Dublin (IR); Michael Maguire, Dublin (IR); Billy Verso, Maynooth (IR)

(73) Assignee: Inter-Tel, Inc., Tempe, AZ (US)

( * ) Notice: Subject to any disclaimer, the term of this patent is extended or adjusted under 35 U.S.C. 154(b) by 838 days.

(21) Appl. No.: 09/813,974

(22) Filed: Mar. 22, 2001

(65) Prior Publication Data

US 2001/0036226 A1 Nov. 1, 2001

(30) Foreign Application Priority Data

Mar. 22, 2000 (IR) .......................................... S2000/0219

(51) Int. Cl.[7] ............................ H04B 1/38; H04B 14/04
(52) U.S. Cl. ...................................... 375/222; 375/242
(58) Field of Search ................................. 375/222, 242, 375/254, 259, 261, 285, 266; 332/103

(56) References Cited

U.S. PATENT DOCUMENTS

| | | | | |
|---|---|---|---|---|
| 5,831,561 A | * | 11/1998 | Cai et al. ..................... | 375/222 |
| 6,009,121 A | * | 12/1999 | Waldron et al. ............. | 375/254 |
| 6,163,570 A | * | 12/2000 | Olafsson ...................... | 375/222 |
| 6,173,015 B1 | * | 1/2001 | Eyuboglu et al. ........... | 375/286 |
| 6,198,776 B1 | * | 3/2001 | Eyuboglu et al. ........... | 375/286 |
| 6,577,683 B1 | * | 6/2003 | Waldron et al. ............. | 375/242 |
| 6,594,306 B1 | * | 7/2003 | Mehrabanzad et al. ..... | 375/222 |
| 6,611,554 B1 | * | 8/2003 | Chouly et al. ............... | 375/222 |
| 6,661,847 B1 | * | 12/2003 | Davis et al. ................. | 375/242 |

\* cited by examiner

Primary Examiner—Betsy L. Deppe
(74) Attorney, Agent, or Firm—Michelle Whittington, Esq

(57) ABSTRACT

A method for transmitting data through an analogue channel from an analogue modem to a digital modem includes encoding data inputted to the analogue modem. An encoder encodes data inputted into the analogue modem into corresponding constellation points of a one-dimensional constellation. During initial handshaking a microprocessor in the digital modem computes the constellation points of the constellation so that mid points between adjacent constellation points coincide with mid points between adjacent codec levels. The computed constellation points of the constellation are transmitted along with the value of the largest constellation point and its corresponding codec level to the analogue modem. By selecting the mid points between the constellation points to correspond with mid points between adjacent codec levels the noise margin is significantly enhanced.

23 Claims, 2 Drawing Sheets

METHOD AND APPARATUS FOR TRANSMITTING DATA FROM AN ANALOGUE MODEM TO A DIGITAL MODEM THROUGH AN ANALOGUE CHANNEL

FIELD OF THE INVENTION

The present invention relates to a method and apparatus for transmitting data from an analogue modem to a digital modem through an analogue channel.

BACKGROUND TO THE INVENTION

In the transmission of data over an analogue channel from an analogue modem to a digital modem the data in general is converted to a series of constellation points of a constellation, and the constellation points are then transmitted through the analogue channel. However, in general analogue channels suffer from a relatively high degree of noise and/or other impairments which distort the constellation points during transmission, thus leading to inaccuracies of decoding the received constellation points. This, in general, is undesirable.

There is therefore a need for a method and apparatus for transmitting data from an analogue modem to a digital modem through an analogue channel which minimises the effect of noise and/or other impairment in the analogue channel on the signals being transmitted through the analogue channel.

The present invention is directed towards providing such a method and apparatus.

SUMMARY OF THE INVENTION

According to the invention there is provided a method for transmitting data from an analogue modem to a digital modem through an analogue channel for minimising the effect of noise and/or other impairments in the analogue channel, the method comprising the steps of:

computing mid points between adjacent codec levels, and
computing constellation points of a constellation for use in transmission of data through the analogue channel, the constellation points being computed so that the mid points between adjacent computed constellation points coincide with respective computed mid points between adjacent codec levels.

Preferably, the constellation points are computed in response to the noise and/or other impairments in the analogue channel.

In one embodiment of the invention the constellation points are computed in the digital modem.

In another embodiment of the invention the constellation, the constellation points of which are computed in the digital modem is transmitted to the analogue modem through the analogue channel.

In one embodiment of the invention the method further comprises the step of computing the values of the mid points between the adjacent computed constellation points, and transmitting the constellation by transmitting the respective mid point values of the constellation points to the analogue modem, along with a single constellation point for facilitating decoding of the constellation.

In another embodiment of the invention he single constellation point is selected from one of the largest and the smallest constellation points.

Preferably, the data to be transmitted by the analogue modem through the analogue channel to the digital modem is encoded in the analogue modem into constellation points of the computed constellation.

In one embodiment of the invention at least some of the constellation points coincide with codec levels.

In another embodiment of the invention each constellation point coincides with a codec level.

Alternatively, none of the computed constellation points coincide with a codec level.

In a further embodiment of the invention the constellation is a one dimensional constellation.

In a further embodiment of the invention the method is adapted for use in telecommunications transmission.

In a still further embodiment of the invention the method is adapted for use with a telecommunications transmission system operation under the V.92 Standard.

Additionally, the invention provides apparatus for transmitting data from an analogue modem to a digital modem through an analogue channel for minimising the effect of noise and/or other impairments in the analogue channel, the apparatus comprising:

a means for computing mid points between adjacent codec levels, and
a means for computing constellation points of a constellation for use in transmission of the data through the analogue channel, the constellation points being computed so that the mid points between adjacent computed constellation points coincide with respective computed mid points between adjacent codec levels.

Preferably, the means for computing the constellation points is responsive to the noise and/or other impairments in the analogue channel.

In one embodiment of the invention the means for computing the constellation points is located in the digital modem.

In another embodiment of the invention the constellation, the constellation points of which are computed in the digital modem is transmitted to the analogue modem through the analogue channel.

In one embodiment of the invention the apparatus further comprises a means for computing the values of the mid points between the adjacent computed constellation points, and transmitting the constellation by transmitting the respective mid point values of the constellation points to the analogue modem, along with a single constellation point for facilitating decoding of the constellation.

In another embodiment of the invention the single constellation point is selected from one of the largest and the smallest constellation point.

In one embodiment of the invention a means is provided in the analogue modem for encoding the data to be transmitted by he analogue modem through the analogue channel to the digital modem into constellation points of the computed constellation.

In one embodiment of the invention the constellation is a one dimensional constellation.

In another embodiment of the invention the apparatus is adapted for use in telecommunications transmission.

In a further embodiment of the invention the apparatus is adapted for use in a telecommunications transmission data system operating under the V.92 Standard.

Further the inventions provides a telecommunications system comprising an analogue modem for transmitting data through an analogue channel for reception by a digital modem, the digital modem comprising apparatus according to the invention.

In a further embodiment of the invention the apparatus operates in accordance with the method according to the invention.

The invention will be more clearly understood from the following description of a preferred embodiment thereof which is given by way of example only with reference to the accompanying drawings.

DETAILED DESCRIPTION OF THE INVENTION

Figure 1:
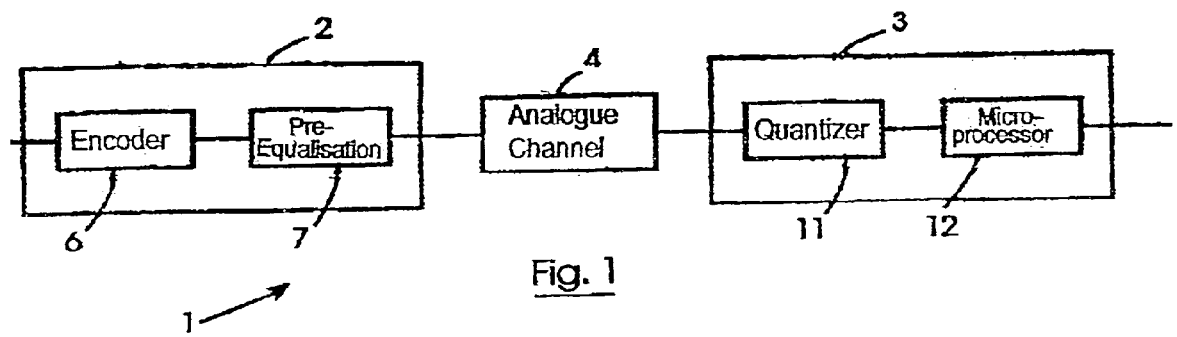
FIG. 1 is a block representation of a telecommunications data transmission system according to the invention.

Referring to the drawings there is illustrated a telecommunications data transmission system according to the invention indicated generally by the reference numeral 1 for transmitting data from an analogue modem 2 of a subscriber to a digital modem 3 located in a central exchange of a telecommunications service provider through an analogue channel 4 of the telecommunications service provider. The transmission system 1 in this embodiment of the invention is operating under the V.92 Telecommunications Transmission Standard.

An encoder 6 in the analogue modem 2 encodes data inputted to the analogue modem 2 into a one dimensional constellation 8 comprising a series of constellation points 9 which correspond to respective analogue voltages, the values of which are computed as will be described below. In FIGS. 2 to 5 typical constellations 8 of constellation points 9 are illustrated by Lines $9a$, $9b$, $9c$, . . . etc with corresponding codec levels 10 which are illustrated by Lines $10a$, $10b$, $10c$, . . . etc. The constellation points 9 are passed through a pre-equalisation stage 7 in the analogue modem 2 for compensating for amplitude distortion in the analogue channel 4, and then the constellation points 9 are transmitted to the analogue channel 4. A quantizer 11 in the digital modem 3, which may be a $\mu$-law or an A-law quantizer, quantizes and decodes the constellation points received from the analogue modem 2 through the analogue channel 4.

During initial handshaking between the analogue modem 2 and the digital modem 3 the constellation points 9 of the constellation 8 to be used during transmission between the analogue modem 2 and the digital modem 3 are determined. A means for computing the constellation points 9 of the constellation comprises a microprocessor 12 in the digital modem 3 which under the control of suitable software computes the constellation points 9 in response to noise and/or other impairments in the analogue channel 4. Initially in the handshaking process between the analogue modem 2 and the digital modem 3, the microprocessor 12 computes the values of mid points 14 between the adjacent codec levels 10. The microprocessor 12 then computes the constellation points 9 for the constellation so that mid points 15 between adjacent constellation points 9 coincide with computed mid points 14 of the codec levels 10. When all the constellation points 9 of the constellation 8 have been computed so that the mid points 15 of adjacent constellation points 9 coincide with mid points 14 of adjacent codec levels 10, the constellation 8 is then transmitted from the digital modem 3 to the analogue modem 2. The constellation 8 may be transmitted from the digital modem 3 to the analogue modem 2 as a series of the computed constellation points 9, or alternatively, the mid points 15 of the constellation points 9 may be computed in the microprocessor 12, and transmitted to the analogue modem 2 along with a single constellation point 9.

On completion of handshaking, data transmission can commence. Data inputted to the analogue modem 2 is encoded by the encoder 6 into appropriate constellation points 9 of the constellation 8 which a pre-equalised in the pre-equalisation stage 7 and transmitted through the analogue channel 4 to the digital modem 3. The quantizer 11 in the digital modem 3 quantizes and decodes the constellation points 9 received from the analogue modem 2.

Referring now to FIGS. 2 to 5, typical constellations 8 of constellation points 9 and their corresponding codec levels 10 will now be described. The constellation points 9 of the constellations 8 of FIGS. 2 to 5 are selected in accordance with the invention so that the mid points 15 between the adjacent constellation points 9 coincide with mid points 14 between respective adjacent codec levels 10. It is not essential that each constellation point 9 should coincide directly with a codec level 10, and indeed, constellation points, 9 in some cases only, will only coincide with codec levels 10 when the spacing between the respective codec levels 10 and constellation points 9 are uniform. Indeed, under the V.92 Telecommunications Transmissions Standard, uniformity of spacing between adjacent codec levels 10 and constellation points 9 occurs only for a small period. However, when the spacing between adjacent codec levels 10 and adjacent constellation points 9 is uniform, and when the spacing between adjacent constellation points 9 is equal to 2N−1 times the spacing between adjacent codec levels 10, where N is an integer equal to 1 or greater, each constellation point 9 should coincide directly with a codec level 10 On the other hand, even where the spacing between adjacent codec levels 10 and constellation points 9 is uniform the constellation points 9 do not coincide with a codec level 10 when the spacing between adjacent constellation points 9 is equal to 2N times the spacing between adjacent codec levels, where N is an integer equal to 1 or greater.

Figure 2:
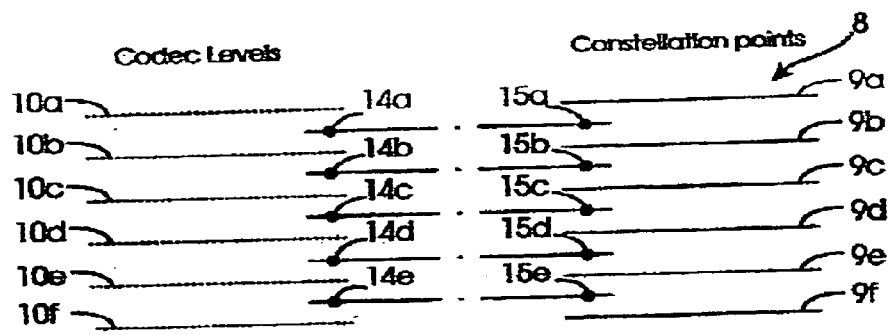
FIG. 2 illustrates a constellation of constellation points with corresponding codec levels.

In FIG. 2 six constellation points 9 are computed with their respective mid points 15 coinciding with the mid points 14 between the corresponding codec levels 10. The spacing between the adjacent constellation points 9 and the adjacent codec levels 10 is uniform. Additionally, the spacing between the adjacent constellation points 9 is equal to 2N−1 times the spacing between adjacent codec levels, where N is equal to 1. In other words, there are the same number of constellation points 9 as codec levels 10. Thus, in this case each constellation point 9 coincides with a corresponding codec level 10.

Figure 3:
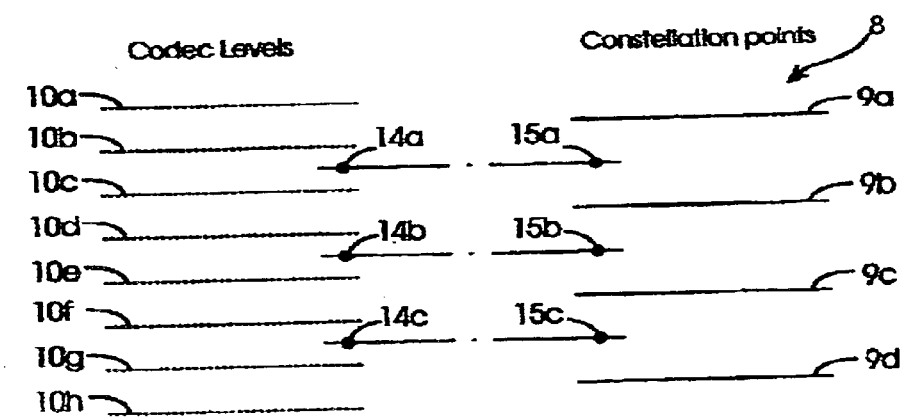
FIG. 3 illustrates another constellation of constellation points with corresponding codec levels.

In FIG. 3 four constellation points 9 are computed so that the mid points 15 between adjacent constellation points 9 coincide it respective mid points 14 between adjacent codec levels 10. The spacing between adjacent constellation points 9 and adjacent codec levels 10 is uniform, Additionally, the spacing between adjacent constellation points 9 corresponding to twice the spacing between adjacent codec levels 10. In other words, the spacing between adjacent constellation points 9 is 2N times the spacing between adjacent codec levels 10, where N equals 1. In this case the constellation points 9 do not coincide with codec levels 10.

Figure 4:
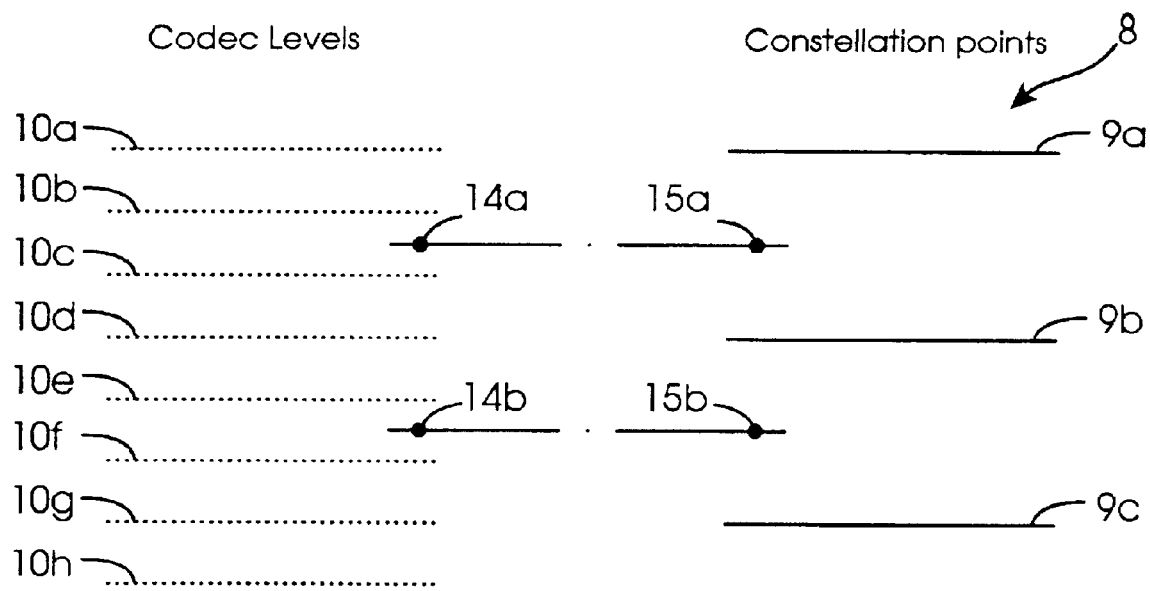
FIG. 4 illustrates a further constellation of constellation points with corresponding codec levels.

In FIG. 4 three constellation points 9 are computed so that the mid points 15 between respective adjacent constellation points 9 coincide with mid points 14 between adjacent codec levels 10. The spacing between adjacent constellation points 9 and adjacent codec levels 10 is uniform, and the spacing between adjacent constellation points 9 is equal to 2N−1 times the spacing between adjacent codec levels 10, where N equals 2. In other words, the spacing between adjacent constellation points 9 is equal to three times the spacing between adjacent codec levels 10. Because the spacing between adjacent constellation points 9 is equal to three times the spacing between adjacent codec levels 10 and the spacing between adjacent constellation points 9 and codec levels 10 is uniform, each constellation point 9 coincides with a codec level 10.

Figure 5:
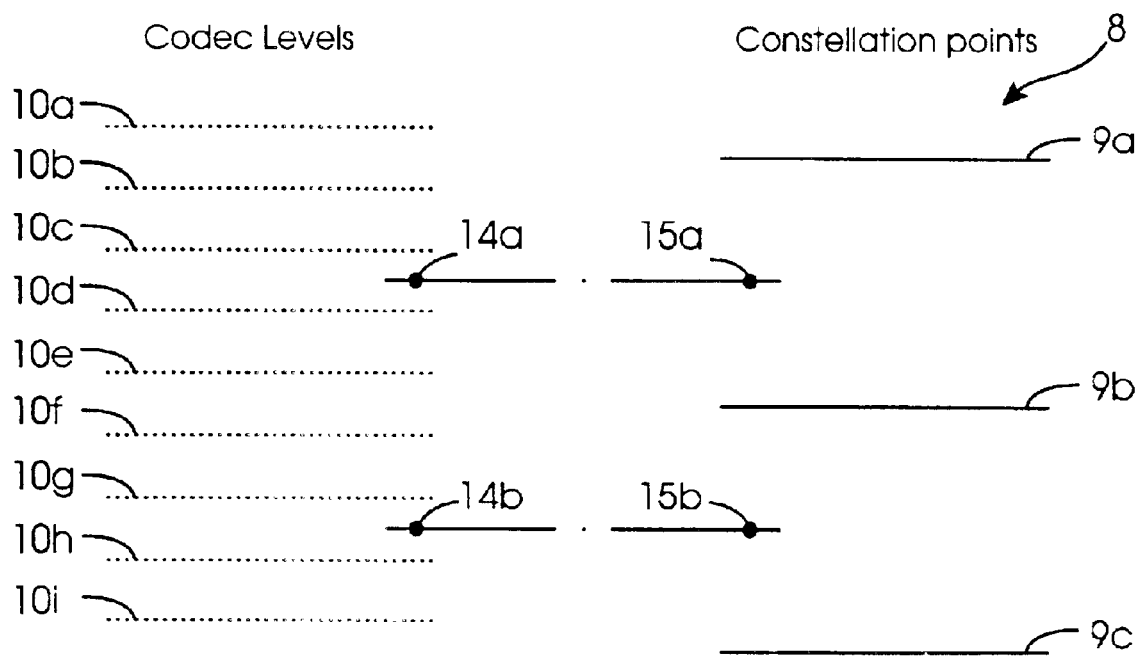
FIG. 5 illustrates a still further constellation of constellation points with corresponding codec levels.

In FIG. 5 three constellation points 9 are computed so that the mid points 15 between adjacent constellation points 9 coincide with the mid points 14 between adjacent codec levels 10. The spacing between constellation points 9 and adjacent codec levels 10 is uniform, and the spacing between adjacent constellation points 9 is equal to 2N times the spacing between adjacent codec levels 10, where N is equal to 2, in other words, the spacing between adjacent constellation points 9 is equal to four times the spacing between adjacent codec levels 10. In this case, the constellation points 9 do not coincide with codec levels 10.

Each constellation 8 can be fully described by the respective mid points 15 of the constellation points 9 and a single constellation point 9 as an absolute reference. Accordingly, the digital modem 3 need only transmit the voltage values of the mid points 15 of the constellation points 9 and either the largest or smallest value constellation point 9. The analogue modem 2 can then readily easily determine the constellation points 9 of the constellation 8, and from that the corresponding codec levels 10 can be determined. Since the constellation points 9 of the constellation 8 are computed so that the mid points 18 of adjacent constellation points coincide with mid points 14 between the codec levels 10, the mid points 14 of the codec levels 10 which coincide with mid points 15 of the constellation points 9 of the constellation 8 can readily easily be identified in a bit mask by setting a bit in the bit mask to indicate that the corresponding mid point 14 between adjacent codec levels 10 coincides with a mid point 15 of a pair of adjacent constellation points 9 of the constellation 8. The bit of the bit mask can be cleared for indicating mid points 14 of adjacent codec levels 10 for which there is no corresponding mid point 15 of the constellation 8.

The advantages of the invention are many. By computing the constellation points 9 so that the mid points 15 between pairs of adjacent constellation points 9 coincide with mid points 14 between pairs of adjacent codec levels 10, the effect of noise and distortion on the signal transmitted through the analogue channel 4 is minimised. For example, in FIG. 2 where the spacing between adjacent constellation points corresponds to the spacing between adjacent codec levels, the noise margin is half the distance between the codec levels 19. In FIG. 3 where the spacing between adjacent constellation points 9 is twice the spacing between adjacent codec levels 10 the noise margin is equal to the spacing between adjacent codec levels 10. For example, if after decoding in the digital modem 3, codec levels 10c or 10d are received, and if the distortion is completely random, and if all constellation points 9 are equally likely to be transmitted, then it can be assumed that the constellation point 9b was transmitted. In FIG. 4 where the spacing between adjacent constellation points 9 is three times the spacing between adjacent codec levels 10 the codec levels 10 which coincide with the constellation points 9 have an even better noise margin.

In FIG. 5 where the constellation points are selected so that the spacing between adjacent constellation points 9 is four times the spacing between adjacent codec levels 10 the mid level points 15 have the best noise margin.

By selecting the constellation points 9 so that the mid points 15 between the adjacent constellation points 9 of the constellations 8 coincide with mid points 14 of the codec levels 10, the quantizer quantizes the noise and distortion in the most advantageous direction when a decision is being made in determining a particular constellation point.

While in the examples of FIGS. 2 to 5, specific numbers of constellation points have been computed in the respective constellations, it will be readily apparent to those skilled in the art that constellations of any number of constellation points from two upwards may be computed. The number of constellation points would typically be dependent on the quality of the analogue channel.

What is claimed is:

1. A method for transmitting data form an analogue modem to a digital modem through an analogue channel for minimising an effect of noise and/or other impairments in the analogue channel, the method comprising the steps of:
   computing mid points between adjacent codec levels, and
   computing constellation points of a constellation for use in transmission of data through the analogue channel, the constellation points being computed so that the mid point between adjacent computed constellation points coincide with respective computed mid points between adjacent codec levels.

2. A method as claimed in claim 1 in which the constellation points are computed in response to the noise and/or other impairments in the analogue channel.

3. A method as claimed in claim 1 in which the constellation points are computed in the digital modem.

4. A method as claimed in claim 3 in which the constellation is transmitted to the analogue modem through the analogue channel.

5. A method as claimed in claim 3 in which the method further comprises the step of computing the values of the mid points between the adjacent computed constellation points, and transmitting the constellation by transmitting the respective mid point values of the constellation points to the analogue modem, along with a single constellation point for facilitating decoding of the constellation.

6. A method as claimed in claim 5 in which the single constellation point is selected from one of the largest and the smallest constellation points.

7. A method as claimed in claim 1 in which the data to be transmitted by the analogue modem through the analogue channel to the digital modem is encoded in the analogue modem into constellation points of the computed constellation.

8. A method as claimed in claim 1 in which at least some of the constellation points coincide with codec levels.

9. A method as claimed in claim 8 in which each constellation point coincides with a codec level.

10. A method as claimed in claim 1 in which none of the computed constellation points coincide with a codec level.

11. A method as claimed in claim 1 in which the constellation is a one dimensional constellation.

12. A method as claimed in claim 1 in which the method is adapted for use in telecommunications transmission.

13. A method as claimed in claim 1 in which the method is adapted for use with a telecommunications transmission system operating under the V.92 Standard.

14. A telecommunications system in which an apparatus operates in accordance with the method as claimed in claim 1.

15. Apparatus for transmitting data form an analogue modem to a digital modem through an analogue channel for minimising an effect of noise and/or other impairments in the analogue channel, the apparatus comprising:

a means for computing mid points between adjacent codec levels, and a means for computing constellation points of a constellation for use in transmission of data through the analogue channel, the constellation points being computed so that the mid point between adjacent computed constellation points coincide with respective computed mid points between adjacent codec levels.

16. Apparatus as claimed in claim 15 in which the means for computing the constellation points is responsive to the noise and/or other impairments in the analogue channel.

17. Apparatus as claimed in claim 15 in which the means for computing the constellation points is located in the digital modem.

18. Apparatus as claimed in claim 17 in which the constellation is transmitted to the analogue modem through the analogue channel.

19. Apparatus as claimed in claim 17 in which the apparatus further comprises means for computing the values of the mid points between the adjacent computed constellation points, and transmitting the constellation by transmitting the respective mid point values of the constellation points to the analogue modem, along with a single constellation point for facilitating decoding of the constellation.

20. Apparatus as claimed in claim 19 in which the single constellation point is selected from one of the largest and the smallest constellation points.

21. Apparatus as claimed in claim 15 in which the constellation is a one dimensional constellation.

22. A method as claimed in claim 15 in which the apparatus is adapted for use with a telecommunications transmission system operating under the V.92 Standard.

23. A telecommunications system comprising an analogue modem for transmitting data through an analogue channel for reception by a digital modem, the digital modem comprising apparatus as claimed in claim 15.

* * * * *